(12) United States Patent
Li

(10) Patent No.: US 8,897,227 B2
(45) Date of Patent: Nov. 25, 2014

(54) METHOD AND SYSTEM FOR MANAGING TERMINAL STATES OR TERMINAL EVENTS IN MACHINE-TO-MACHINE OR MACHINE-TO-MAN OR MAN-TO-MACHINE (M2M) SERVICE

(75) Inventor: Hui Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 111 days.

(21) Appl. No.: 13/583,631

(22) PCT Filed: Mar. 11, 2011

(86) PCT No.: PCT/CN2011/071746
§ 371 (c)(1),
(2), (4) Date: Sep. 8, 2012

(87) PCT Pub. No.: WO2011/150707
PCT Pub. Date: Dec. 8, 2011

(65) Prior Publication Data
US 2012/0327945 A1 Dec. 27, 2012

(30) Foreign Application Priority Data
May 31, 2010 (CN) .......................... 2010 1 0188391

(51) Int. Cl.
H04Q 7/00 (2006.01)
H04Q 7/24 (2006.01)
H04W 4/00 (2009.01)
H04L 12/26 (2006.01)

(52) U.S. Cl.
CPC ........... *H04W 4/005* (2013.01); *H04L 43/0817* (2013.01); *H04W 4/001* (2013.01); *H04L 43/0811* (2013.01)
USPC .......................................... 370/328; 370/338

(58) Field of Classification Search
USPC .......................... 370/252, 254, 328, 338, 401
See application file for complete search history.

(56) References Cited

U.S. PATENT DOCUMENTS

| 8,531,986 B2 * | 9/2013 | Raleigh .......................... 370/252 |
| 2006/0087973 A1 | 4/2006 | Huang |

(Continued)

FOREIGN PATENT DOCUMENTS

| CN | 101180852 A | 5/2008 |
| CN | 101384013 A | 3/2009 |

(Continued)

OTHER PUBLICATIONS

Supplementary European Search Report in European application No. 11789086.3, mailed on Aug. 22, 2013.

(Continued)

*Primary Examiner* — Hong Cho
(74) *Attorney, Agent, or Firm* — Oppedahl Patent Law Firm LLC

(57) ABSTRACT

The disclosure discloses a method for managing terminal states or terminal events in a Machine-to-Machine, Machine-to-Man or Man-to-Machine (M2M) service, including: a terminal or a terminal gateway transmits state or event information of itself to a state or event management unit through a gateway device; an M2M service platform determines a service interaction operation with the terminal or the terminal gateway according to the state or event information of the terminal or the terminal gateway in the state or event management unit. The disclosure also discloses a system for managing terminal states or terminal events in an M2M service. With the method and the system, a network side can know the state or event of a terminal in time, and process services according to the state or event of the terminal, thus the success rate of the service is improved.

12 Claims, 4 Drawing Sheets

(56) References Cited

U.S. PATENT DOCUMENTS

| | | |
|---|---|---|
| 2010/0011063 A1 | 1/2010 | Blaiotta |
| 2011/0128911 A1* | 6/2011 | Shaheen ........................ 370/328 |
| 2011/0164511 A1* | 7/2011 | Poon et al. .................... 370/252 |
| 2011/0228750 A1* | 9/2011 | Tomici et al. ................. 370/338 |

FOREIGN PATENT DOCUMENTS

| | | |
|---|---|---|
| CN | 201319608 Y | 9/2009 |
| KR | 20060117053 A | 11/2006 |

OTHER PUBLICATIONS

Machine-to-machine communications (M2M); Functional architecture; 54 pages Apr. 9, 2010.

M2M_Adhoc_Group_Report_v13 clean; 50 pages Jan. 15, 2009.

International Search Report in international application No. PCT/CN2011/071746, mailed on Jun. 16, 201.

English Translation of the Written Opinion of the International Search Authority in international application No. PCT/CN2011/071746, mailed on Jun. 16, 2011.

* cited by examiner

METHOD AND SYSTEM FOR MANAGING TERMINAL STATES OR TERMINAL EVENTS IN MACHINE-TO-MACHINE OR MACHINE-TO-MAN OR MAN-TO-MACHINE (M2M) SERVICE

TECHNICAL FIELD

The disclosure relates to the field of communication technologies, and in particular to a method and a system for managing terminal states or terminal events in a Machine-to-Machine or Machine-to-Man or Man-to-Machine (M2M) service.

BACKGROUND

With the continuous development of telecommunication services and Internet services, in order to better generate and provide services, and meanwhile to reduce the operation cost of operators, competitive telecommunication services and Internet services are provided and various service platforms emerge as the time requires. At present, with the further enlargement of the service application scope, a requirement for a M2M service is proposed gradually. The full name of M2M is Machine-to-Machine or Machine-to-Man or Man-to-Machine. Generally, the M2M service includes a data service and a message service, wherein the data service generally is born on Packet Switch (PS) of a telecommunication network; and the message service can be born on Circuit Switch (CS), also can be born on PS.

The M2M service is described below in further detail.

An M2M communication system provides simple means for using equipment real-time data to establish a wireless connection between systems, between remote devices, or between individuals. The M2M communication technology combines data collection technology, remote monitoring technology, telecommunication and information technology, automatizes a service process, integrates the real-time state of a company Information Technology (IT) system and non-IT equipment, and creates value-added services. An M2M platform can run in environments such as security monitoring, automatic muni-meter reading, mechanical service, maintenance service, vender, public transport system, vehicle fleet management, industrial process automation, motor machine and urban informationization, and provide widespread application and solutions.

At present, the M2M service application can be divided into a mobile application and an immobile application based on whether a terminal is moveable, wherein the mobile application is suitable for such applications in which peripheral equipment is not fixed, has high mobility, and needs real-time communication with a central node, for example, it is suitable for such industries as transportation, public security, customs, tax administration, medical treatment and logistics; while the immobile application is suitable for such applications in which peripheral equipment is fixed but geographically widespread, wired access is difficult to deploy or the cost is very high, for example, it is suitable for such industries as electric power, water conservation, oil extraction, mining, environment protection, meteorology, tobacco and finance.

The M2M communication technology involves four important technical parts, specifically including: an M2M machine terminal, a communication network, an M2M platform and an M2M application, wherein the M2M machine terminal includes machine hardware and a communication module; for a mobile network, the communication module is configured to implement the access of the M2M machine terminal to the communication network and to implement communication; the machine hardware is configured to implement an M2M service. The M2M machine terminal can be divided into two types, namely, an M2M terminal device and an M2M terminal gateway device, wherein the M2M terminal gateway device can access an extended network, for example, a sensor network, an industrial control network, a broadcast television network or a satellite communication network, and other information interaction networks. The disclosure calls the M2M terminal device a terminal and calls the M2M terminal gateway device a terminal gateway for short in the following descriptions.

The communication network is configured to transmit M2M service data between terminals, as well as between a terminal and an M2M service platform, and can include a wide area network, a local area network, a wireless personal area network or the like.

The M2M platform is a component part for realizing M2M service logics, which implements the management of a terminal downwards and provides an open function of an Application Program Interface (API) to the M2M application upwards in a network hierarchical architecture diagram. In addition, the M2M platform is also configured to perform service logic processing. The M2M platform is an important part in the M2M industry chain, and an operator realizes the control on an M2M service by controlling the M2M platform. The M2M application develops and provides applications of corresponding industries by calling the API provided by the M2M platform.

The M2M application can be divided into two types of services according to an initiator of a service, namely, a service initiated by a terminal side and a service initiated by a network side.

The service initiated by the terminal side generally is a service data report service, an alarm information report service, or the like, and there are two bearing modes, namely, a service in which interaction is performed based on CS and a service in which interaction is performed is based on PS. Before a terminal actively initiates a service, the terminal might be in a message mode, that is, the terminal holds short messaging online but has no data connection, or the terminal probably keeps or has a data connection, or both of the two conditions coexist. When the terminal is in the message mode and needs to perform services on the PS, the terminal needs to establish a data connection channel before performing services.

The service initiated by the network side has similarities to the service initiated by the terminal side, that is, its service interaction also can be performed through a message mode or a data connection mode. For a service performed through the message mode, a message is generally transmitted through a message gateway, for example, a Short Messaging Service (SMS) gateway, a Multimedia Messaging Service (MMS) gateway, a Wireless Application Protocol (WAP) gateway, a Unstructured Supplementary Service Data (USSD) gateway, an industry gateway and other network entities; for a service performed in the data connection mode, the network side might adopt an existing data connection channel to initiate the service directly, however, when there is no data connection channel, the terminal is needed to be activated through the message mode first and then actively establish a data connection before a related service is performed.

At present, the service initiated by the network side has problems as follows: no matter the message mode or the data connection mode is adopted to perform services, if the M2M service platform of the network side does not know the state of a terminal or the change of the state, that is, an event, the service probably can not be transmitted; for example, when the terminal is out of battery or has high loads, or the current signal is weak, the terminal probably can not work normally, and at this moment, the network side can not learn the state or event of the terminal in time, thus the service can not be performed successfully; or, when the M2M terminal or the terminal gateway simultaneously supports multiple communication modes, if the M2M service platform can not learn the state or event of the terminal in time, a different communication mode cannot be selected.

SUMMARY

In view of the problems above, the main purpose of the disclosure is to provide a method and a system for managing terminal states or terminal events in an M2M service, so as to enable a network side to obtain a state or event of a terminal and to make a service judgment and perform service processing according to the state or event of the terminal, thereby improving the efficiency of the service.

In order to achieve the purpose above, the technical solution of the disclosure is realized as follows.

The disclosure provides a method for managing terminal states or terminal events in an M2M service, which includes:

transmitting, by a terminal or a terminal gateway, state or event information of itself to a state or event management unit; and determining, by an M2M service platform, a service interaction operation with the terminal or the terminal gateway according to the state or event information of the terminal or the terminal gateway in the state or event management unit;

wherein, the state or event management unit may be set in the M2M service platform, or may be set separately; correspondingly, when the state or event management unit is set separately, the state or event management unit may also provide a function of adding, inquiring about, modifying and deleting state or event information for the M2M service platform;

wherein, the transmitting, by a terminal or a terminal gateway, the state or event information of itself to a state or event management unit may include:

transmitting, by the terminal or the terminal gateway, the state or event information of itself to the state or event management unit which is set separately or to the state or event management unit which is set in the M2M service platform, through a gateway device.

The method may further include:

determining, by the gateway device, a target M2M service platform or the state or event management unit which is set separately, according to an identifier or an application identifier of the terminal or the terminal gateway contained in a message reported by the terminal or the terminal gateway.

The method may further include:

transmitting, by the terminal or the terminal gateway, the state or event information of itself to the M2M service platform or to the state or event management unit which is set separately through the gateway device, when the terminal or the terminal gateway receives a state or event information request transmitted by the M2M service platform or the state or event management unit which is set separately.

In the solution above, the state or event information of the terminal or the terminal gateway may be one of the following: reachablility, unreachableness, a signal condition, an abnormal condition, a communication mode, an electric quantity or load condition.

The disclosure also provides a system for managing terminal states or terminal events in an M2M service, which includes: a terminal or a terminal gateway, a gateway device, a state or event management unit and an M2M service platform, wherein the terminal or the terminal gateway is configured to transmit state or event information of itself to the state or event management unit through the gateway device;

the gateway device is configured to transmit the state or event information reported by the terminal or the terminal gateway to the state or event management unit;

the state or event management unit is configured to store the state or event information of the terminal or the terminal gateway; and the M2M service platform is configured to determine a service interaction operation with the terminal or the terminal gateway according to the state or event information of the terminal or the terminal gateway stored in the state or event management unit;

wherein, the state or event management unit may be set in the M2M service platform or may be set separately; correspondingly, when the state or event management unit may be set separately, the state or event management unit may also provide a function of adding, inquiring about, modifying and deleting state or event information for the M2M service platform;

wherein, the terminal or the terminal gateway may be further configured to transmit the state or event information of itself to the M2M service platform or to the state or event management unit which is set separately through the gateway device, when receiving a state or event information request transmitted by the M2M service platform or the state or event management unit which is set separately; correspondingly, the M2M service platform or the state or event management unit which is set separately may be further configured to transmit the state or event information request to the terminal or the terminal gateway through the gateway device;

the gateway device may be further configured to transmit the state or event information request transmitted by the M2M service platform or the state or event management unit which is set separately to the terminal or the terminal gateway.

In the solution above, the gateway device may be a Short Messaging Service (SMS) gateway, a Multimedia Messaging Service (MMS) gateway, a WAP gateway, a USSD gateway, an industry gateway, a Gateway GPRS Support Node (GGSN) or a public data network gateway device.

In the method and the system provided by the disclosure for managing terminal states or terminal events in an M2M service, the terminal or the terminal gateway transmits state or event information of itself to the state or event management unit set separately or to the state or event management unit set in the M2M service through the gateway device, then the M2M service platform determines a service interaction operation with the terminal or the terminal gateway according to the state or event information of the terminal or the terminal gateway acquired from the state or event management unit. The operation specifically includes: the M2M service platform inquires about and obtains the state or event information of the terminal or the terminal gateway from the state or event management unit; or, the state or event management unit actively reports the state or event information of the terminal or the terminal gateway to the M2M service platform; then the M2M service platform can perform the following operations according to the state or event information of the terminal or the terminal gateway: when the terminal or the terminal gateway changes from offline to online, from high load to low load or from low bandwidth to high bandwidth, switching from CS online to PS online, that is, from an SMS state to an IP state, or switching from PS online to CS online, that is, from SMS online to IP online. The M2M service platform can transmit service messages or data to or perform service interaction with the M2M terminal or the M2M terminal gateway according to the information above.

In the disclosure, the terminal or the terminal gateway reports state or event information; in addition, the state or event management unit updates in time the state or event information reported by the terminal or the terminal gateway, so that the state or event information stored in the state or event management unit is consistent with the actual state or event of the terminal or the terminal gateway, and that the state or event information of the terminal or the terminal gateway inquired and obtained by the M2M service platform before the M2M service platform transmits a service is accurate, that is to say, the M2M service platform can learn the state or event of the terminal or the terminal gateway in time, thereby improving the efficiency of the following service of the M2M service platform.

DETAILED DESCRIPTION

Figure 1:
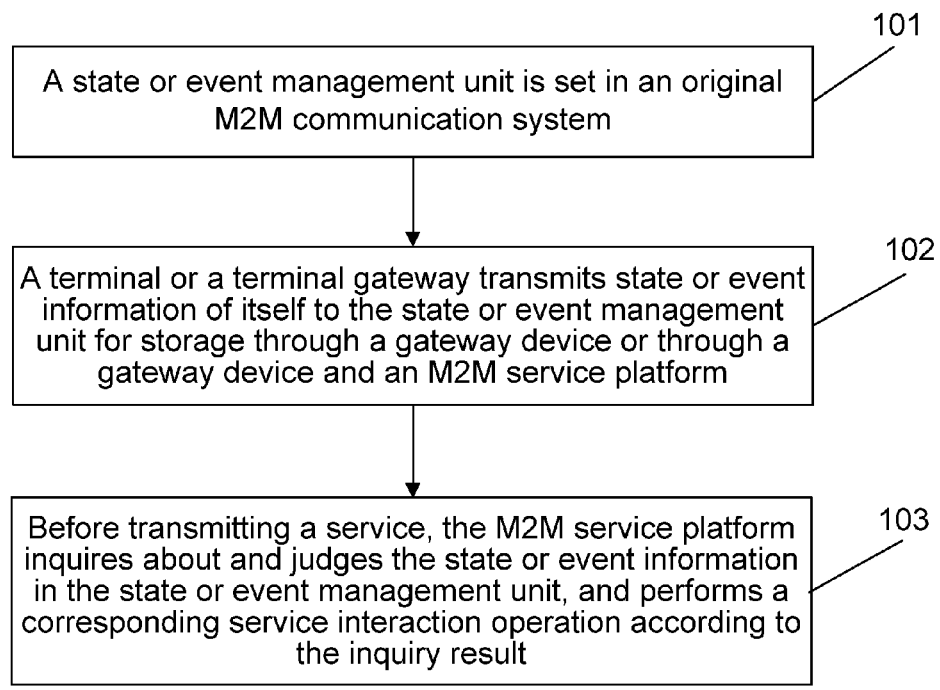
FIG. 1 shows a flowchart of a method for managing terminal states or terminal events in an M2M service of the disclosure.

An existing M2M communication system mainly includes an M2M application, an M2M service platform, a gateway device in a communication network, a terminal and a terminal gateway, wherein the gateway device may be a Short Messaging Service (SMS) gateway, a Multimedia Messaging Service (MMS) gateway, a WAP gateway, a USSD gateway, an industry gateway, a Gateway GPRS Support Node (GGSN) or a public data network gateway device, or the like, and is mainly used for terminal access control, terminal information registration, data routing or the like; the M2M service platform is used for providing functions such as service management, service establishment, service generation, service calling and service capability abstraction; the M2M application is used for calling service capability from and providing the M2M application to the M2M service platform; the terminal and the terminal gateway are located at the bottom layer of the network architecture of the M2M communication system, and can access the communication network through multiple modes such as a wired mode and a wireless mode to perform service interaction with the M2M service platform.

The basic idea of the disclosure is that: a state or event management unit is added in an original M2M communication system; during a service operation process, a terminal or a terminal gateway transmits state or event information of itself to the state or event management unit through a gateway device; an M2M service platform determines a service interaction operation with the terminal or the terminal gateway according to the state or event information of the terminal or the terminal gateway in the state or event management unit;

wherein, the state or event management unit is set in the M2M service platform, or is set separately.

In the disclosure, the state or event information of the terminal or the terminal gateway may be: reachability, unreachableness, a signal condition, an abnormal condition, a communication mode, a load condition or the like, wherein the reachability refers to that the terminal or the terminal gateway can establish a data link with the M2M service platform or the terminal is in an active state or event; the unreachableness refers to that the terminal or the terminal gateway has no data link with the service platform or the terminal is in a non-active state or event; the signal condition refers to the strength condition of a wireless signal of the terminal or the terminal gateway in the current environment; the abnormal condition refers to that the terminal or the terminal gateway is in an abnormal working state or event; the load condition refers to the current working load condition of the terminal or the terminal gateway, wherein the load condition can be divided into such levels as high, general, low; and the communication mode refers to that the terminal or the terminal gateway currently is PS online, or CS online, or online in other communication modes, for example, a Wideband Code Division Multiple Access (WCDMA) mode, a Time Division-Synchronization Code Division Multiple Access (TD-SCDMA) mode, a Code Division Multiple Access (CDMA) 2000 mode, a CDMA mode, a Global System for Mobile Communications (GSM) mode, a Wireless Local Area Network (WLAN) mode, a fixed access mode, or the like.

The disclosure is described below in further detail in conjunction with accompanying drawings and specific embodiments.

FIG. 1 shows a flowchart of a method for managing terminal states or terminal events in an M2M service of the disclosure; as shown in FIG. 1, the process includes the following implementation steps.

Step 101: a state or event management unit is set in an original M2M communication system;

wherein, the state or event management unit may be set in an M2M service platform, or set separately; when the state or event management unit is set separately, an interface for communication with the M2M service platform is set simultaneously, and is used by the state or event management unit to receive and store state or event information reported by a terminal or a terminal gateway through a gateway device and the M2M service platform, so that the state or event information can be provided to the M2M service platform to search for in the following operation.

Here, when the state or event management unit is set separately, in order to support the function above, a corresponding interface function needs to be provided to perform service interaction related to state or event information with the M2M service platform, for example, operations such as adding, inquiring about, modifying or deleting state or event information.

Step 102: during the service operation, a terminal or a terminal gateway transmits state or event information of itself to the state or event management unit to store through a gateway device or through a gateway device and an M2M service platform.

Specifically, during the service operation, for example, when the terminal or the terminal gateway is electrified and when the terminal or the terminal gateway performs login, or when the terminal or the terminal gateway changes a state or event, the terminal or the terminal gateway actively reports the state or event information of itself to the gateway device, then the state or event information is transmitted to the state or event management unit for storage through the gateway device, or the state or event information of the terminal or the terminal gateway is transmitted to the M2M service platform through the gateway device first and then to the state or event management unit to be stored and managed by the state or event management unit.

Here, since the gateway device has a plurality of different types, correspondingly, the terminal or the terminal gateway may transmit the state or event information through SMS, MMS, USSD, WAP, IP or the like.

Further, during the service operation, the terminal or the terminal gateway also can transmit the state or event information of itself to the M2M service platform when receiving a state or event information request transmitted by the M2M service platform or the state or event management unit, or transmit the state or event information to the state or event management unit through the gateway device or through the gateway device and the M2M service platform;

wherein the state or event information of the terminal or the terminal gateway managed by the state or event management unit corresponds to an identifier of the terminal or the terminal gateway, so that the M2M service platform can search for the state or event information of the terminal or the terminal gateway through the identifier of the corresponding terminal or terminal gateway.

During the service operation, when the gateway device finds that the state or event of the terminal or the terminal gateway is abnormal, the gateway device reports the state or event information to the M2M service platform, which then transmits the state or event information of the terminal or the terminal gateway to the state or event management unit; or the gateway device directly transmits the state or event information of the terminal or the terminal gateway to the state or event management unit.

Here, the state or event information reported by the terminal or the terminal gateway can be divided into: reachability, unreachableness, a signal condition, an abnormal condition, a communication mode, a load condition or the like. After the terminal or the terminal gateway is just started, that is, when the terminal or the terminal gateway is electrified or is to perform login, the terminal or the terminal gateway actively reports the state or event information of itself to the gateway device, then the state or event information is transmitted to the state or event management unit through the gateway device or through the gateway device and the M2M service platform; during the service operation, when the terminal or the terminal gateway detects the change of the state or event of itself, the terminal or the terminal gateway actively transmits the changed state or event information to the state or event management unit through the gateway device or through the gateway device and the M2M service platform.

In addition, when the state or event information of the terminal or the terminal gateway changes, the terminal or the terminal gateway also would transmit the state or event information of itself to the state or event management unit through the gateway device, or through the gateway device and the M2M service platform.

And Step 103: before transmitting a service to the terminal or the terminal gateway, the M2M service platform inquires about and makes a judgment on state or event information of the corresponding terminal or terminal gateway in the state or event management unit, and performs a corresponding service interaction operation according to the state or event information obtained through inquiry.

Specifically, before actively initiating the service interaction with the terminal or the terminal gateway, the M2M service platform inquires about and makes a judgment on state or event information of the corresponding terminal or terminal gateway in the state or event management unit, and then performs a corresponding service interaction operation according to the state or event information obtained through inquiry. For example, when the terminal is CS online, the interaction is performed through SMS, USSD or MMS, or the like; when the terminal is PS online, the interaction is performed through IP.

The method for managing terminal states or terminal events of the disclosure is illustrated below in detail in conjunction with a plurality of specific embodiments.

Embodiment 1

Figure 2:
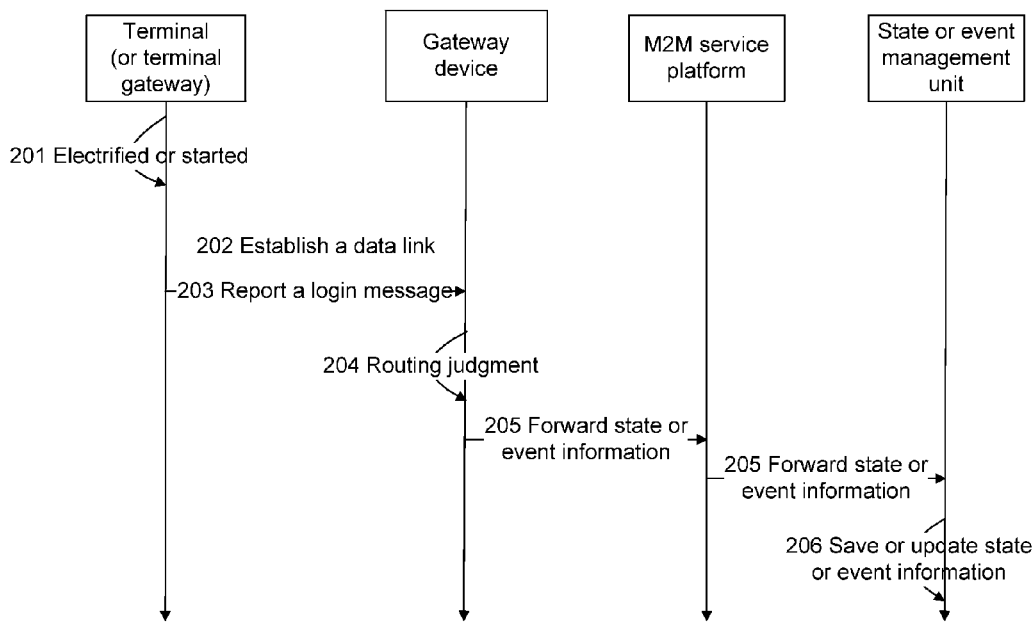
FIG. 2 shows a flowchart of the state or event management when a terminal or a terminal gateway is electrified and started in an M2M service according to an embodiment of the disclosure.

FIG. 2 shows a flowchart of the state or event management when a terminal or a terminal gateway is electrified and started in an M2M service according to an embodiment of the disclosure; as shown in FIG. 2, the process includes the following implementation steps:

Step 201: a terminal or a terminal gateway is electrified or started;

Step 202: when the terminal or the terminal gateway supports a link of IP mode, the terminal or the terminal gateway initiates a data link to and establishes the data link with a gateway device;

Step 203: the terminal or the terminal gateway reports a login message to the gateway device;

Step 204: the gateway device judges routing according to information contained in the login message reported by the terminal or the terminal gateway;

here, the information contained in the login message includes: an identifier or an application identifier of the terminal or the terminal gateway, wherein each identifier includes information of an M2M service platform corresponding to the terminal, in this way, the gateway device can determine a corresponding target M2M service platform according to the identifier information above;

Step 205: the gateway device transmits the state or event information to a state or event management unit through the M2M service platform;

a case that the gateway device directly transmits state or event information to the state or event management unit is not referred to in this embodiment; and Step 206: the state or event management unit saves or updates the state or event information of the terminal or the terminal gateway.

Embodiment 2

Figure 3:
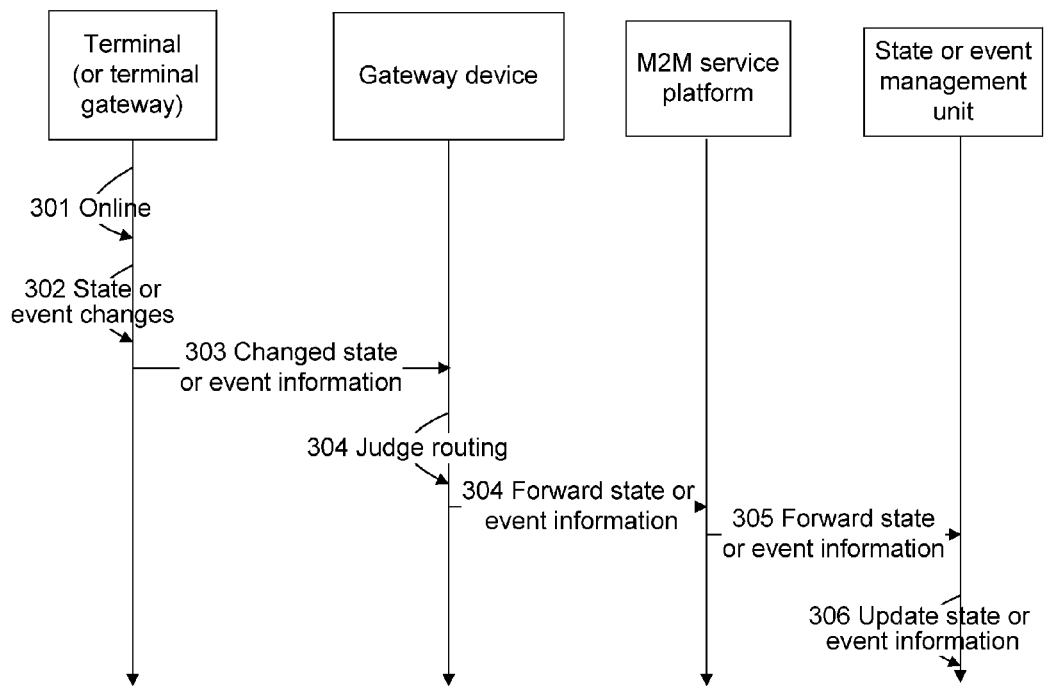
FIG. 3 shows a flowchart of the state or event management when a terminal or a terminal gateway changes a state or event in an M2M service according to an embodiment of the disclosure.

FIG. 3 shows a flowchart of the state or event management when a terminal or a terminal gateway changes a state or event in an M2M service according to an embodiment of the disclosure; as shown in FIG. 3, the process includes the following implementation steps:

Step 301: a terminal or a terminal gateway is on line;

Step 302: a state or event of the terminal or the terminal gateway changes;

Step 303: the terminal or the terminal gateway transmits the changed state or event information to a gateway device;

Step 304: the gateway device judges routing according to a message reported by the terminal or the terminal gateway and transmits the state or event information to an M2M service platform;

here, the message reported by the terminal or the terminal gateway in Step 303 includes an identifier or an application identifier of the terminal or the terminal gateway; and the gateway device determines a corresponding target M2M service platform according to the identifier information above;

Step 305: the M2M service platform forwards the state or event information to a state or event management unit;

this embodiment does not involves a case that the gateway device transmits state or event information to the state or event management unit directly; and Step 306: the state or event management unit updates corresponding state or event information.

Embodiment 3

Figure 4:
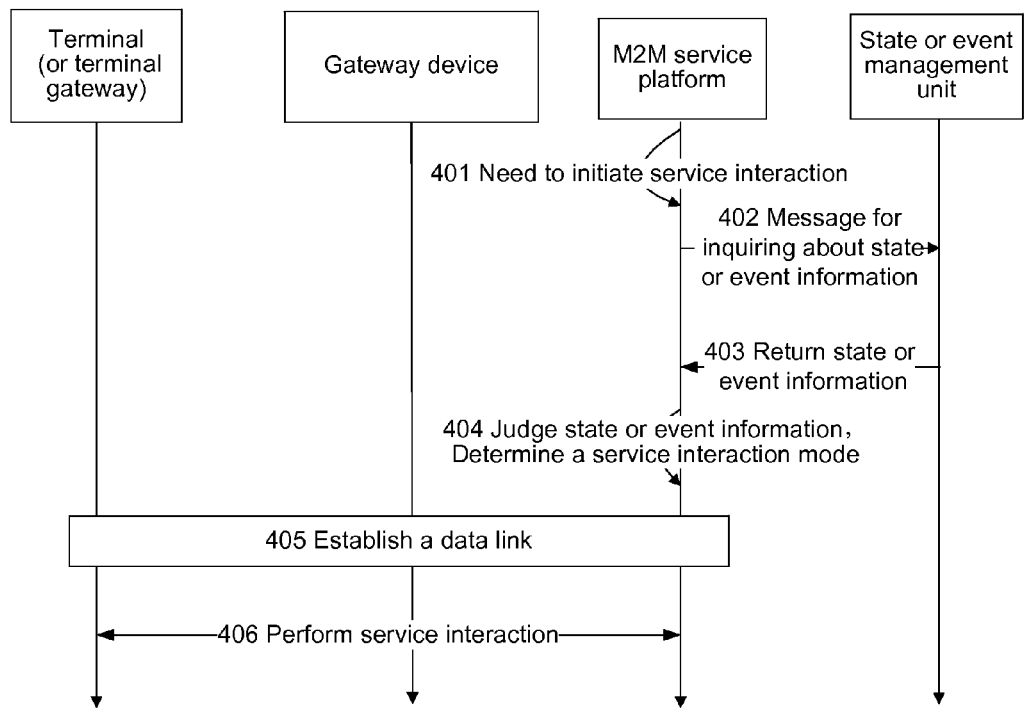
FIG. 4 shows a flowchart of an M2M service platform performing a corresponding service interaction operation according to state or event information in an M2M service according to an embodiment of the disclosure.

FIG. 4 shows a flowchart of an M2M service platform performing a corresponding service interaction operation according to state or event information in an M2M service according to an embodiment of the disclosure; as shown in FIG. 4, the process includes the following implementation steps:

Step 401: an M2M service platform needs to initiate service interaction with a terminal or a terminal gateway;

Step 402: the M2M service platform transmits a message for inquiring about state or event information of the terminal or the terminal gateway to a state or event management unit;

wherein the inquired message includes identifier information of the terminal or the terminal gateway;

Step 403: the state or event management unit returns corresponding state or event information to the M2M service platform;

Step 404: the M2M service platform judges the received state or event information and determines a service interaction mode;

Step 405: the M2M service platform establishes a data link with the terminal or the terminal gateway according to the judgment result; and Step 406: the M2M service platform performs the service interaction with the terminal or the terminal gateway.

Figure 5:
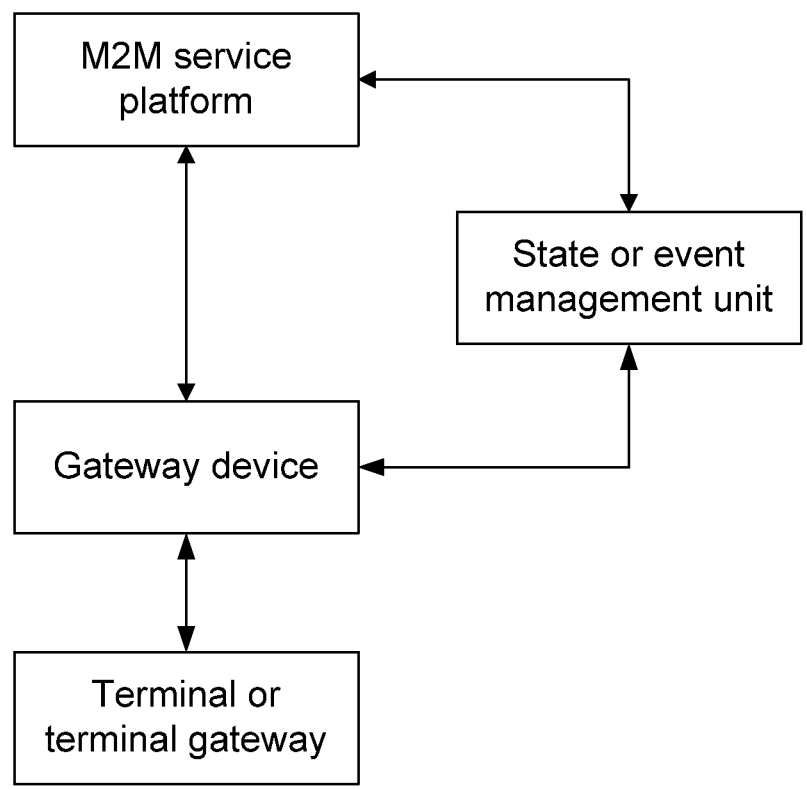
FIG. 5 shows a structure diagram of a system for managing terminal states or terminal events in an M2M service of the disclosure.

FIG. 5 shows a structure diagram of a system for managing terminal states or terminal events in an M2M service of the disclosure; as shown in FIG. 5, the system includes: a terminal or a terminal gateway, a gateway device, a state or event management unit and an M2M service platform, wherein the terminal or the terminal gateway is configured to transmit state or event information of itself to the state or event management unit through the gateway device;

the gateway device is configured to transmit the state or event information reported by the terminal or the terminal gateway to the state or event management unit;

the state or event management unit is configured to store the state or event information of the terminal or the terminal gateway; and the M2M service platform is configured to determine a service interaction operation with the terminal or the terminal gateway according to the state or event information of the terminal or the terminal gateway stored in the state or event management unit.

The state or event management unit is set in the M2M service platform or is set separately; correspondingly, when the state or event management unit is set separately, the state or event management unit also provides a function of adding, inquiring about, modifying and deleting state or event information for the M2M service platform.

The terminal or the terminal gateway is further configured to transmit the state or event information of itself to the M2M service platform or to the state or event management unit which is set separately through the gateway device, when receiving a state or event information request transmitted by the M2M service platform or the state or event management unit which is set separately, during the service operation; correspondingly, the M2M service platform or the state or event management unit which is set separately is further configured to transmit the state or event information request to the terminal or the terminal gateway through the gateway device, during the service operation;

the gateway device is further configured to transmit the state or event information request transmitted by the M2M service platform or the state or event management unit which is set separately to the terminal or the terminal gateway.

The gateway device may be of a plurality of types, including: an SMS gateway, a MMS gateway, a WAP gateway, a USSD gateway, an industry gateway, a GGSN gateway or a public data network gateway device; correspondingly, the terminal or the terminal gateway may transmit state or event information through SMS, MMS, USSD, WAP, IP, or the like.

Here, the state or event information of the terminal or the terminal gateway can be: reachability, unreachableness, a signal condition, an abnormal condition, a communication mode, a load condition, or the like.

It should be noted that the M2M in the disclosure equals the Internet of things or a ubiquitous network; correspondingly, the terminal in the disclosure equals a terminal of the Internet of things or a terminal of the ubiquitous network; the terminal gateway equals a gateway of the Internet of things or a gateway of the ubiquitous network; and the M2M service platform equals a service platform of the Internet of things or a service platform of the ubiquitous network. In addition, the terminal gateway of the M2M can be used to access a sensor network, therefore, the terminal gateway of the M2M equals a gateway of the sensor network.

The above are only the preferred embodiments of the disclosure and are not intended to limit the scope of protection of the disclosure. Any modification, equivalent substitute and improvement made within the spirit and principle of the disclosure are deemed to be included within the scope of protection of the disclosure.

What is claimed is:

1. A method for managing terminal states or terminal events in a Machine-to-Machine, Machine-to-Man or Man-to-Machine (M2M) service, comprising:

transmitting, by a terminal or a terminal gateway, state or event information of itself to a state or event management unit;

determining, by an M2M service platform, a service interaction operation with the terminal or the terminal gateway according to the state or event information of the terminal or the terminal gateway in the state or event management unit; and performing the service interaction operation, between the M2M service platform and the terminal or the terminal gateway, according to the state or event information, wherein when the terminal is CS online, the interaction is performed through SMS, USSD or MMS; when the terminal is PS online, the interaction is performed through IP;

wherein the state or event management unit is set in the M2M service platform, or is set separately;

setting, when the state or event management unit is set separately, an interface on the state or event management unit for receiving and storing state or event information reported by the terminal or a terminal gateway, and for providing a function of adding, inquiring about, modifying and deleting state or event information for the M2M service platform.

2. The method for managing terminal states or terminal events in an M2M service according to claim 1, wherein the transmitting, by a terminal or a terminal gateway, state or event information of itself to a state or event management unit comprises:

transmitting, by the terminal or the terminal gateway, the state or event information of itself to the state or event management unit which is set separately or to the state or event management unit which is set in the M2M service platform, through a gateway device.

3. The method for managing terminal states or terminal events in an M2M service according to claim 2, further comprising:

determining, by the gateway device, a target M2M service platform or the state or event management unit which is set separately, according to an identifier or an application identifier of the terminal or the terminal gateway contained in a message reported by the terminal or the terminal gateway.

4. The method for managing terminal states or terminal events in an M2M service according to claim 2, further comprising:

transmitting, by the terminal or the terminal gateway, the state or event information of itself to the M2M service platform or to the state or event management unit which is set separately through the gateway device, when the terminal or the terminal gateway receives a state or event information request transmitted by the M2M service platform or the state or event management unit which is set separately.

5. The method for managing terminal states or terminal events in an M2M service according to claim 2, wherein the state or event information of the terminal or the terminal gateway is one of the following: reachability, unreachableness, a signal condition, an abnormal condition, a communication mode, an electric quantity or load condition.

6. The method for managing terminal states or terminal events in an M2M service according to claim 1, further comprising:

determining, by a gateway device, a target M2M service platform or the state or event management unit which is set separately, according to an identifier or an application identifier of the terminal or the terminal gateway contained in a message reported by the terminal or the terminal gateway.

7. The method for managing terminal states or terminal events in an M2M service according to claim 1, further comprising:

transmitting, by the terminal or the terminal gateway, the state or event information of itself to the M2M service platform or to the state or event management unit which is set separately through a gateway device, when the terminal or the terminal gateway receives a state or event information request transmitted by the M2M service platform or the state or event management unit which is set separately.

8. The method for managing terminal states or terminal events in an M2M service according to claim 1, wherein the state or event information of the terminal or the terminal gateway is one of the following: reachability, unreachableness, a signal condition, an abnormal condition, a communication mode, an electric quantity or load condition.

9. A system for managing terminal states or terminal events in a Machine-to-Machine, Machine-to-Man or Man-to-Machine (M2M) service, comprising: a terminal or a terminal gateway, a gateway device, a state or event management unit, and an M2M service platform; wherein the terminal or the terminal gateway is configured to transmit state or event information of itself to the state or event management unit through the gateway device;

the gateway device is configured to transmit the state or event information reported by the terminal or the terminal gateway to the state or event management unit;

the state or event management unit is configured to store the state or event information of the terminal or the terminal gateway; and the M2M service platform is configured to determine a service interaction operation with the terminal or the terminal gateway according to the state or event information of the terminal or the terminal gateway stored in the state or event management unit, and to perform the service interaction operation with the terminal or the terminal gateway according to the state or event information, wherein when the terminal is CS online, the interaction is performed through SMS, USSD or MMS; when the terminal is PS online, the interaction is performed through IP;

wherein the state or event management unit is set in the M2M service platform or is set separately;

when the state or event management unit is set separately, an interface is set on the state or event management unit for receiving and storing state or event information reported by the terminal or a terminal gateway, and for providing a function of adding, inquiring about, modifying and deleting state or event information for the M2M service platform.

10. The system for managing terminal states or terminal events in an M2M service according to claim 9, wherein the terminal or the terminal gateway is further configured to transmit the state or event information of itself to the M2M service platform or to the state or event management unit which is set separately through the gateway device, when receiving a state or event information request transmitted by the M2M service platform or the state or event management unit which is set separately;

correspondingly, the M2M service platform or the state or event management unit which is set separately is further configured to transmit the state or event information request to the terminal or the terminal gateway through the gateway device;

the gateway device is further configured to transmit the state or event information request transmitted by the M2M service platform or the state or event management unit which is set separately to the terminal or the terminal gateway.

11. The system for managing terminal states or terminal events in an M2M service according to claim 10, wherein the gateway device is a Short Messaging Service (SMS) gateway, a Multimedia Messaging Service (MMS) gateway, a Wireless Application Protocol (WAP) gateway, a Unstructured Supplementary Service Data (USSD) gateway, an industry gateway, a Gateway GPRS Support Node (GGSN) or a public data network gateway device.

12. The system for managing terminal states or terminal events in an M2M service according to claim 9, wherein the gateway device is a Short Messaging Service (SMS) gateway, a Multimedia Messaging Service (MMS) gateway, a Wireless Application Protocol (WAP) gateway, a Unstructured Supplementary Service Data (USSD) gateway, an industry gateway, a Gateway GPRS Support Node (GGSN) or a public data network gateway device.

\* \* \* \* \*